(12) United States Patent
Boswell et al.

(10) Patent No.: US 11,954,325 B1
(45) Date of Patent: Apr. 9, 2024

(54) METHODS AND SYSTEMS FOR ASSIGNING TEXT ENTRY COMPONENTS TO CURSORS

(71) Applicant: HONEYWELL INTERNATIONAL INC., Charlotte, NC (US)

(72) Inventors: Steven Boswell, Phoenix, AZ (US); Sonia Dodd, Phoenix, AZ (US); Sean Caufield, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/296,254

(22) Filed: Apr. 5, 2023

(51) Int. Cl.
 *G06F 3/04892* (2022.01)
 *G06F 3/04812* (2022.01)
 *G06F 3/04886* (2022.01)

(52) U.S. Cl.
 CPC ...... *G06F 3/04892* (2013.01); *G06F 3/04812* (2013.01); *G06F 3/04886* (2013.01)

(58) Field of Classification Search
 CPC ............. G06F 3/04817; G06F 3/04883; G06F 3/04823; G06F 3/04886; G06F 3/0488; G06F 3/0481; G06F 3/04842; G06F 3/04847; G06F 3/0412; G06F 3/16; G06F 3/0487; G06F 2203/04803; G06F 2203/04808; G06F 40/197; G06F 9/451
 See application file for complete search history.

(56) References Cited

U.S. PATENT DOCUMENTS

| | | | |
|---|---|---|---|
| 4,130,884 A | 12/1978 | Hildinger | |
| 6,421,645 B1 | 7/2002 | Beigi et al. | |
| 7,299,187 B2 | 11/2007 | Tahara et al. | |
| 7,458,029 B2 * | 11/2008 | Agrawala | G06F 9/451 715/764 |
| 7,620,901 B2 * | 11/2009 | Carpenter | G06F 3/0488 715/757 |
| 8,347,215 B2 | 1/2013 | Carpenter et al. | |
| 8,515,763 B2 | 8/2013 | Dong et al. | |
| 9,392,326 B2 | 7/2016 | Lee et al. | |
| 9,569,174 B2 | 2/2017 | Rogers et al. | |

(Continued)

FOREIGN PATENT DOCUMENTS

| | | | |
|---|---|---|---|
| CN | 104570835 A | 4/2015 | |
| CN | 113936650 A | 1/2022 | |

(Continued)

*Primary Examiner* — Dong Hui Liang
(74) *Attorney, Agent, or Firm* — Lorenz & Kopf LLP

(57) ABSTRACT

Vehicle systems and methods are provided for associating text entry components with software applications in a decoupled software environment. One method involves a user input management service associating a user input from a user input device with an interactive application based on a location associated with the user input, providing the user input to the application based on the association, wherein the application responds to the user input, receiving indication of selection of a text input element by the user input from the application. In response to the indication of selection of the text input element, the user input management service associates a text entry component with the application and thereafter provides a text input received from the associated text entry component to the application based on the association between the text entry component and the application, wherein the application responds to the text input.

20 Claims, 4 Drawing Sheets

(56) References Cited

U.S. PATENT DOCUMENTS

| | | |
|---|---|---|
| 9,959,861 B2 | 5/2018 | Zhou et al. |
| 9,965,035 B2 | 5/2018 | Santamaria et al. |
| 9,983,664 B2 | 5/2018 | Kim et al. |
| 9,996,231 B2 | 6/2018 | Missig et al. |
| 10,127,564 B2 | 11/2018 | Heath |
| 10,191,619 B2 | 1/2019 | Yoon et al. |
| 10,445,355 B2 | 10/2019 | Miller et al. |
| 10,447,744 B2 | 10/2019 | Feldman et al. |
| 10,558,351 B2 | 2/2020 | Shan |
| 10,664,122 B2 | 5/2020 | Choi et al. |
| 10,991,364 B1 | 4/2021 | Hoover et al. |
| 11,002,558 B2 | 5/2021 | Santamaria et al. |
| 11,144,535 B2 | 10/2021 | Gilbertson et al. |
| 11,221,729 B1 | 1/2022 | Bauchot et al. |
| 11,467,711 B2 | 10/2022 | Ma et al. |
| 11,714,539 B1 | 8/2023 | Boswell et al. |
| 2002/0036660 A1 | 3/2002 | Adan et al. |
| 2003/0066016 A1 | 4/2003 | Wehage |
| 2005/0180327 A1 | 8/2005 | Banerjee et al. |
| 2006/0168531 A1 | 7/2006 | Sato |
| 2006/0212291 A1 | 9/2006 | Matsuo |
| 2007/0052725 A1 | 3/2007 | Ostojic et al. |
| 2007/0153806 A1 | 7/2007 | Celinski et al. |
| 2007/0288129 A1 | 12/2007 | Komer et al. |
| 2010/0180210 A1 | 7/2010 | Toyama et al. |
| 2010/0293501 A1 | 11/2010 | Russ et al. |
| 2012/0110403 A1 | 5/2012 | Chen et al. |
| 2013/0104065 A1 | 4/2013 | Stecher |
| 2013/0162519 A1 | 6/2013 | Ameling et al. |
| 2013/0241840 A1 | 9/2013 | Durojaiye |
| 2014/0019873 A1 | 1/2014 | Gupta et al. |
| 2014/0040756 A1* | 2/2014 | Bukurak ............ G06F 3/04886 715/741 |
| 2014/0363799 A1 | 12/2014 | Brown |
| 2016/0321841 A1 | 11/2016 | Christen et al. |
| 2016/0360382 A1* | 12/2016 | Gross ................. G06F 9/445 |
| 2020/0233501 A1 | 7/2020 | Jacobs |
| 2020/0249811 A1 | 8/2020 | Lemay et al. |
| 2021/0342785 A1 | 11/2021 | Mann et al. |
| 2022/0100463 A1 | 3/2022 | Crouch et al. |

FOREIGN PATENT DOCUMENTS

| | | |
|---|---|---|
| CN | 111338555 B | 3/2022 |
| EP | 1487171 A1 | 12/2004 |
| EP | 3998527 A2 | 5/2022 |
| JP | 2013239137 A | 11/2013 |
| JP | 7051756 B2 | 4/2022 |
| WO | 2019063496 A1 | 4/2019 |
| WO | 2021184375 A1 | 9/2021 |
| WO | 2022005819 A1 | 1/2022 |
| WO | 2022143198 A1 | 7/2022 |

\* cited by examiner

METHODS AND SYSTEMS FOR ASSIGNING TEXT ENTRY COMPONENTS TO CURSORS

TECHNICAL FIELD

The subject matter described herein relates generally to vehicle systems, and more particularly, embodiments of the subject matter relate to cursor and keypad management for aircraft systems and related cockpit touchscreen displays.

BACKGROUND

Modern electronic displays for vehicles (such as aircraft, automobiles, marine vessels, or trains) display a considerable amount of information, such as vehicle position, navigation and terrain information. In the case of an aircraft, many modern flight deck displays (or cockpit displays) are utilized to provide a number of different displays from which the user can obtain information or perform functions related to, for example, navigation, flight planning, guidance and navigation, and performance management. The cockpit of an aircraft is often equipped with any number of different user input devices, such as, joysticks, knobs, buttons, keys, cursor control devices CCDs and the like, along with touchscreens, touch panels, audio input devices, and other emerging technologies.

Traditionally, a user input device may be linked to an avionics system or other software application for directly receiving user input from the user input device. However, it is desirable to decouple the sources or generators of user input from the recipients of the user input, for example, to provide improved flexibility and interoperability as well as accommodating retrofitting or upgrading while maintaining reliability and resiliency by reducing the amount of modifications required in the cockpit, which in turn may reduce costs or need for recertification.

Modern aircraft often include one or more touchscreens placed between the pilot and co-pilot to function as a shared interface capable of receiving input from both the pilot and co-pilot concurrently. However, electronic displays onboard vehicles are often small and compact due to limited available space and other constraints on locations where displays can be located. As a result, manipulating onboard electronic displays, such as a touchscreen display in an aircraft cockpit, in order to arrive at a desired selection can be time consuming, inefficient, and error prone, particularly when multiple different graphical user interface (GUI) displays or windows associated with different software applications or services are concurrently depicted. Accordingly, it is desirable to improve the ease of interaction with GUI displays to support text or character entry using keypads, keyboards or other dedicated text entry components that alleviate the challenges associated with limited display area. Other desirable features and characteristics will become apparent from the subsequent detailed description and the appended claims, taken in conjunction with the accompanying drawings and this background.

BRIEF SUMMARY

Vehicle systems and methods are provided for associating text entry components with software applications in a decoupled software environment. One method involves a user input management service associating a user input from a user input device with a first application based on a location associated with the user input corresponding to a first graphical user interface (GUI) display associated with the first application, providing the user input to the first application based on the association, wherein the first application responds to the user input, and receiving indication of selection of a text input element by the user input from the first application. In response to the indication of selection of the text input element, the user input management service identifies a text entry component to be associated with the first application, associates the text entry component with the first application, and thereafter receives a text input from the text entry component and provides the text input to the first application based on the association between the text entry component and the first application, wherein the first application responds to the text input.

An apparatus for a computer-readable medium is also provided. The computer-readable medium has computer-executable instructions stored thereon that, when executed by a processing system, cause the processing system to associate a user input from a user input device with a first application based on a location associated with the user input corresponding to a first graphical user interface (GUI) display associated with the first application, provide the user input to the first application based on the association, wherein the first application responds to the user input, receive indication of selection of a text input element by the user input from the first application, in response to the indication of selection of the text input element, identify a text entry component to be associated with the first application and associate the text entry component with the first application, and thereafter receive a text input from the text entry component and provide the text input to the first application based on the association between the text entry component and the first application, wherein the first application responds to the text input.

A system is also provided that includes a cursor control user input device to provide a user input, a text entry user input device to provide a text input, an interactive application to provide a graphical user interface (GUI) display comprising a text input GUI element, and a user input management service coupled to the cursor control user input device, the text entry user input device, and the interactive application to associate the user input from the cursor control user input device with the interactive application based on a location associated with the user input corresponding to the GUI display associated with the interactive application, provide the user input to the interactive application based on the association, wherein the interactive application renders a graphical representation of a cursor in response to the user input within the GUI display, receive indication of selection of the text input GUI element by the user input from the interactive application, associate the text entry user input device with the interactive application in response to the indication of selection of the text input GUI element, and thereafter provide the text input to the interactive application based on the association between the text entry user input device and the interactive application, wherein the interactive application responds to the text input.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF DRAWINGS

Exemplary embodiments of the subject matter of the present disclosure will hereinafter be described in conjunction with the following drawing figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to electrically controlled vehicle systems. For purposes of explanation, the subject matter is described herein primarily in the context of a flight deck display, an electronic flight bag (EFB) or other cockpit display onboard an aircraft in an aviation context. However, it should be understood that the subject matter described herein is not necessarily limited to use with aircraft or other vehicle systems or applications and may be similarly utilized in other application, systems or environments, including, but not limited to use with other types of vehicles (e.g., automobiles, marine vessels, trains, etc.).

Figure 1:
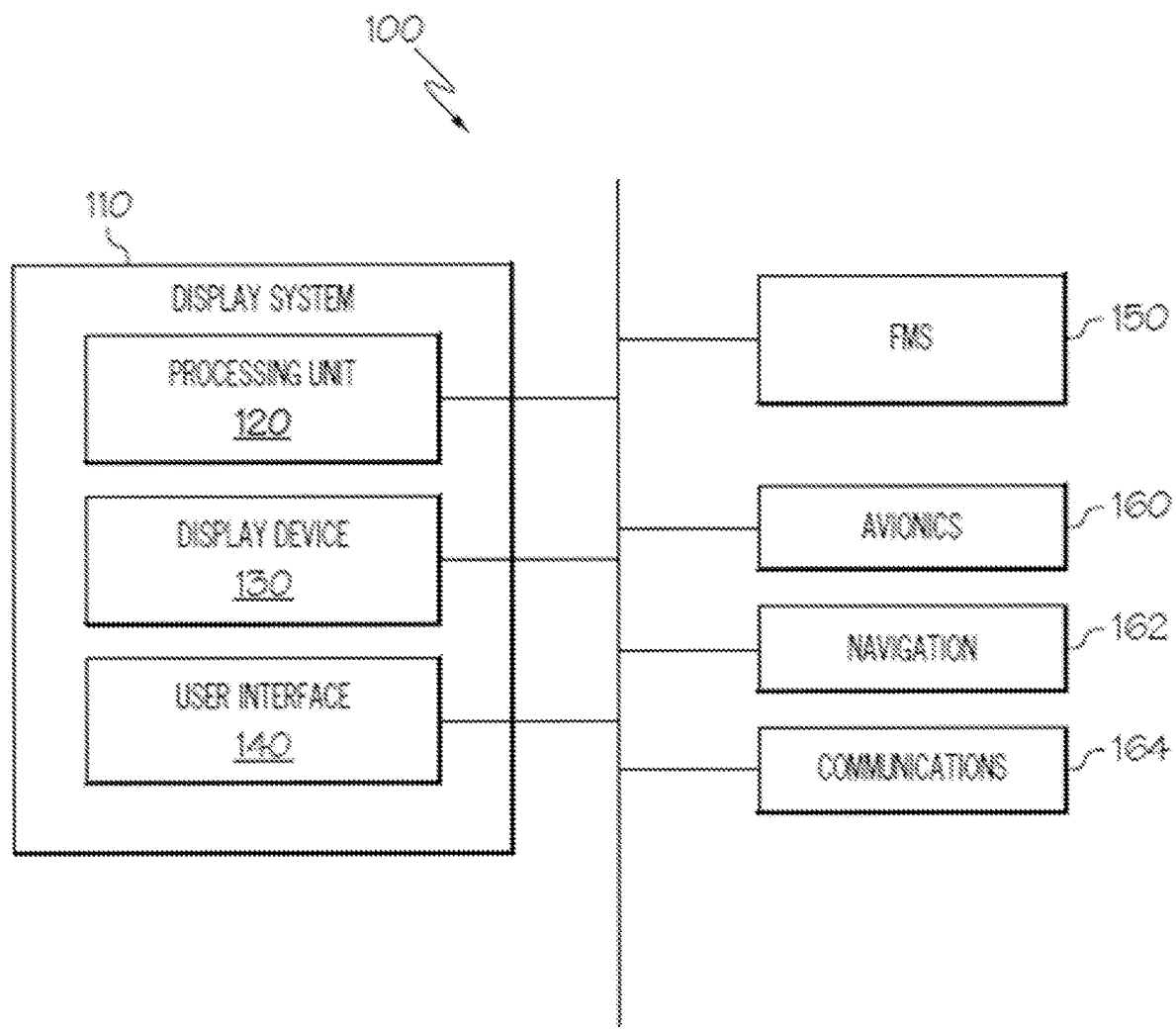
FIG. 1 is a block diagram of a system for an aircraft in accordance with one or more exemplary embodiments.

FIG. 1 is a schematic representation of an aircraft system 100 with a visual display system 110 coupled to a flight management system (FMS) 150 and one or more data sources 160, 162, 164. The components and subcomponents of system 100 may be coupled together in any suitable manner, such as with a data bus. Although the system 100 appears in FIG. 1 to be arranged as an integrated system, the subject matter described herein is not so limited and can also include an arrangement whereby one or more aspects of the system 100 are separate components or subcomponents of another system located either onboard or external to the aircraft.

The visual display system 110 includes a processing unit 120, a display device 130, and a user interface 140. Generally, the visual display system 110 displays information from the FMS 150 via the display device 130 and enables interaction between a user (e.g., a pilot or other type of operator) and the FMS 150, as described in greater detail below.

In one or more embodiments, the processing unit 120 is a computer processor associated with flight planning and management functions, particularly the display and navigation of a list of waypoints, such as in a flight plan. In one exemplary embodiment, the processing unit 120 functions to at least receive and/or retrieve aircraft flight management information (e.g., from the FMS 150 and data sources 160, 162, 164). The processing unit 120 may also generate display commands for displaying the flight management information. In this regard, the processing unit 120 may function as a graphics display generator to generate display commands based on algorithms or other machine instructions stored in the processing unit 120 or in separate memory components. The processing unit 120 may then send the generated display commands to display device 130 for presentation to the user. The processing unit 120 may additionally receive and generate display commands based on inputs via the user interface 140.

Depending on the embodiment, the processing unit 120 may be implemented or realized with a general-purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 120 includes processing logic that may be configured to carry out the functions, techniques, and processing tasks or methods associated with operation of the system 100. The processing unit 120 may further include any suitable type of memory or data storage, such as for example, RAM, ROM, EEPROM, flash memory, optical or magnetic storage devices, or any other medium that can be used to store and access desired information.

The display device 130 is coupled to the processing unit 120 for rendering information to the user based on display commands. In one exemplary embodiment, the display device 130 may be a multifunction monitor, unit, or any display suitable for displaying various symbols and information, such as a multifunction control display unit (MCDU), cockpit display device (CDU), primary flight display (PFD), and/or navigation display. Any suitable type of display medium capable of visually presenting multi-colored or monochrome flight information for a pilot or other flight crew member can be provided, such as, for example, various types of CRT displays, LCDs, OLED displays, plasma displays, projection displays, HDDs, HUDs, and the like.

In exemplary embodiments, the user interface 140 is coupled to the processing unit 120 to allow a user to interact with the display device 130 and/or other elements of the system 100. The user interface may be realized as a keypad, touchpad, keyboard, mouse, touch panel, joystick, knob, line select key or another suitable device adapted to receive input from a user. In further embodiments, the user interface 140 is realized as audio input and output devices, such as a speaker, microphone, audio transducer, audio sensor, or the like. In some embodiments, the user interface may be incorporated into the display device 130. For example, in one or more embodiments, the display device 130 and user interface 140 are integrated as an interactive MCDU with a display screen and a keyboard, touchscreen and/or other mechanisms for function, display, and/or cursor control.

The FMS 150 is coupled to the display system 110 and one or more data sources 160, 162, 164 and generally functions to support navigation, flight planning, and other aircraft control functions, as well as provides real-time data and/or information regarding the operational status of the aircraft. The FMS 150 may include or otherwise access one or more of the following: a weather system, an air traffic management system, a radar system, a traffic avoidance system, an autopilot system, a flight control system, crew alerting systems, electronic checklist systems, an electronic flight bag, and/or other suitable avionics systems. In particular, the FMS 150 may store and/or generate a flight plan for traveling between a current or initial destination and a final destination.

The data sources 160, 162, 164 can include any suitable type of data source that may be used to construct or modify the flight plan, such as an avionics database 160, a navigation system 162, and a communications system 164, as examples. The avionics database 160 may store aeronautical information data, including, for example, flight plan data, data related to airways, navigational aids, navigational data, obstructions, taxi registration, Special Use Airspace, political boundaries, COM frequencies, approach information, geographical information and the like. The navigation system 162 is configured to provide real-time navigational data and/or information regarding operation of the aircraft. The communications system 164 is suitably configured to support communications between the aircraft and another aircraft or ground location (e.g., air traffic control) via a radio system or another suitable data link system.

In one or more exemplary implementations, the display system 110 particularly functions to display a flight plan, including as examples, a selected or otherwise designated flight plan for subsequent execution, a flight plan selected for review, and/or a flight plan currently being executed by the aircraft. In some embodiments, the FMS 150 may store predefined flight plans, while in further embodiments, the flight plan may be uplinked via the communications system 164 and/or manually entered or created by the user via the user interface 140. In one or more exemplary embodiments, the display system 110 renders or otherwise provides a lateral map or other navigational map that includes a graphical representation of at least a portion of the route defined by the flight plan. In addition to the displayed flight plan flight path, the lateral map may also include graphical representations of terrain, meteorological conditions, navigational reference points (e.g., waypoints, navigational aids, distance measuring equipment (DMEs), very high frequency omni-directional radio ranges (VORs), and the like), designated special use airspaces or airspace restrictions, air traffic, obstacles, and/or the like. In this regard, the lateral map may include different layers of graphical elements that are based on or otherwise derived from different data sources, which, in some embodiment, may be selectively added or removed from the display. Additionally, graphical elements in different data layers may be collocated or otherwise correspond to overlapping geographic locations or regions, such that different types of graphical elements may overlie one another on the display.

In exemplary embodiments, the flight plan includes a sequence of navigational reference points or waypoints that define a flight path or route to be flown by the aircraft. In practice, waypoints may have various types of characteristics, attributes, or properties associated therewith. These characteristics may be a function of the waypoint itself or a function of the placement of the waypoint within the flight plan. For example, a waypoint may be associated with a particular type of aircraft procedure (e.g., a turn or holding procedure) or be associated with a designated constraint, such as noise, altitude, and/or speed constraints. As further examples, a waypoint may be associated with a specific segment of the flight plan (e.g., departure, en route, approach, missed approach, and/or alternate flight plan). One or more of the characteristics, attributes and/or properties associated with a given waypoint may be presented in association with that waypoint when that waypoint is currently selected.

Generally, the FMS 150 may associate different characteristics to waypoints of a flight plan based on various factors. For example, the FMS 150 may determine some waypoint characteristics based on information from the navigation system 162 and/or avionics database 160 (e.g., identifying a waypoint as a runway or compulsory reporting point; identifying stored defined patterns associated with the waypoint, such as procedure turns, published holding patterns, etc.) or based on flight plan modifications (e.g., the crew and/or operator may insert a holding pattern at a specific waypoint as instructed by ground station). In practice, the FMS 150 may evaluate and divide the entire flight plan to map the waypoints to specific flight phases (or segments), e.g., departure, en-route, arrival procedures, etc. For example, the FMS 150 can assign waypoints from origin to top of climb as departure waypoints; from top of climb to top of descent including any step climbs as en-route waypoints; and from top of descent to destination as arrival waypoints. In this manner, the FMS 150 may identify different logical groupings of waypoints according to logically distinct operational segments of the flight plan.

In one or more implementations, the display system 110 and/or processing unit 120 displays, renders or otherwise presents a navigational map graphical user interface (GUI) display on a display device 130 onboard an aircraft. A navigational map generally includes a graphical representation of a portion of route defined by a flight plan for the aircraft and a graphical representation of the aircraft overlaid or rendered on top of a background. Depending on the implementation, the background may include graphical representations of the terrain, topology, navigational reference points, airspace designations and/or restrictions, or other suitable items or points of interest corresponding to the currently displayed area of the navigational map, based upon corresponding data which may be maintained in a terrain database, a navigational database, a geopolitical database, or another suitable database. For example, the display system 110 and/or processing unit 120 may render a graphical representation of navigational aids (e.g., VORs, VORTACs, DMEs, and the like) and airports within the currently displayed geographic area of the navigational map overlying the background. Some embodiments of the navigational map may also include graphical representations of airspace designations and/or airspace restrictions, cities, towns, roads, railroads, and other geo-political information. Depending on the implementation, the navigational map may depict a top view (e.g., from above the aircraft), alternatively referred to as a lateral map or lateral view, or various perspective views, such as side views, three-dimensional views (e.g., a three-dimensional synthetic vision display), angular or skewed views, and the like. The displayed area of the navigational map generally corresponds to the geographic area that is currently displayed in the navigational map, that is, the field of view about the center location of the navigational map. In this regard, the center location of the navigational map may correspond to a reference geographic location for the middle or geometric center of the navigational map.

In one or more exemplary embodiments, the navigational map is associated with the movement of the aircraft, and the aircraft symbology and/or background refreshes or otherwise updates as the aircraft travels, such that the graphical representation of the aircraft is positioned over the terrain background in a manner that accurately reflects the current (e.g., instantaneous or substantially real-time) real-world positioning of the aircraft relative to the earth. In some embodiments, the aircraft symbology is shown as traveling across the navigational map (e.g., by updating the location of the aircraft symbology with respect to the background), while in other embodiments, the aircraft symbology may be located at a fixed position on the navigational map (e.g., by updating the background with respect to the aircraft symbology such that the map is maintained centered on and/or aligned with the aircraft symbology). Additionally, depending on the embodiment, the navigational map may be oriented in a cardinal direction (e.g., oriented north-up so that moving upward on the map corresponds to traveling northward), or alternatively, the orientation of the navigational map may be track-up or heading-up (i.e., aligned such that the aircraft symbology is always traveling in an upward direction and the background adjusted accordingly).

Figure 2:
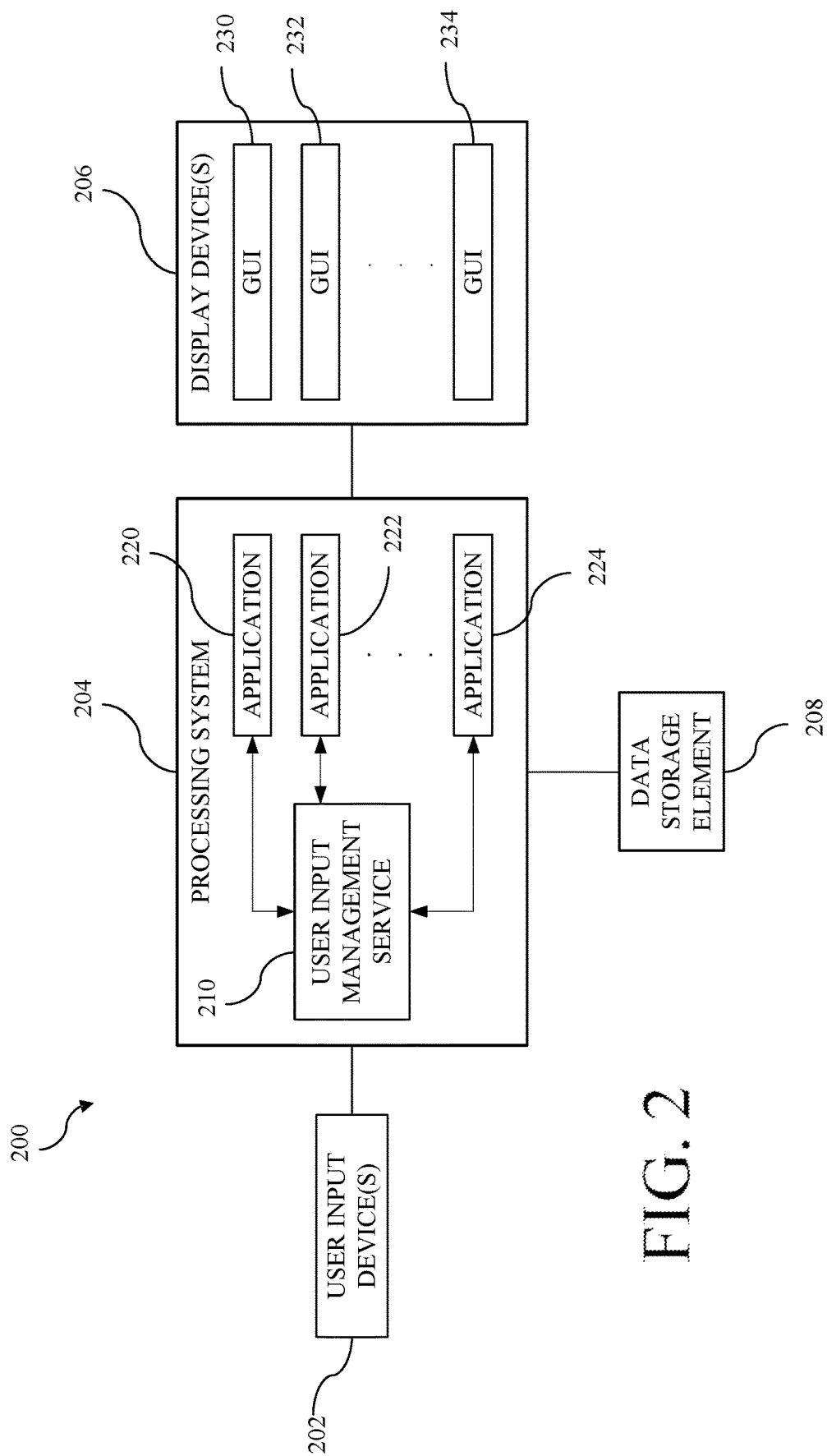
FIG. 2 depicts an exemplary display system suitable for use with the aircraft system of FIG. 1 in one or more exemplary embodiments.

FIG. 2 depicts an exemplary embodiment of a display system 200 suitable for use in a vehicle system, such as the aircraft system 100 of FIG. 1. The display system 200 includes, without limitation, one or more user input devices 202 (e.g., user interface 140) that are coupled to a processing system 204 (e.g., processing unit 120) that supports user interaction with one or more GUI displays 230, 232, 234 that are displayed, rendered or otherwise provided on one or more display devices 206 (e.g., display device 130) that are coupled to the processing system 204. It should be appreciated that FIG. 2 is a simplified representation of the display system 200 for purposes of explanation and is not intended to be limiting.

The user input device(s) 202 generally represent the human-machine interface hardware components that allow a user (e.g., a pilot, co-pilot, or crew member) to interact with the GUI displays 230, 232, 234 provided on the display device(s) 206 and/or other elements coupled to the display system 200 (e.g., the FMS 150 or other onboard avionics systems 160, 162, 164). Depending on the embodiment, the user input device(s) 202 may include or otherwise be realized as a cursor control device (CCD), keypad, touchpad, keyboard, mouse, touch panel (or touchscreen), joystick, knob, line select key or another suitable device adapted to receive input from a user, including microphones or other audio input devices. The display device(s) 206 generally represent the electronic display hardware capable of graphically displaying information (e.g., flight information or other data associated with operation of the aircraft) under control of the processing system 204.

The processing system 204 generally represents the hardware, software, and/or firmware components configured to facilitate communications and/or interaction between the user input device(s) 202, the display device(s) 206 and potentially other elements coupled to the display system 200 (e.g., the FMS 150 or other onboard avionics systems 160, 162, 164) and perform additional tasks and/or functions to support operation of the display system 200, as described in greater detail below. Depending on the embodiment, the processing system 204 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 204 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 204 includes processing logic that may be configured to carry out the functions, techniques, and processing tasks associated with the operation of the display system 200, as described in greater detail below. Furthermore, the steps of a method or algorithm described in connection with the embodiments disclosed herein may be embodied directly in hardware, in firmware, in a software module executed by the processing system 204, or in any practical combination thereof. For example, in one or more embodiments, the processing system 204 includes or otherwise accesses a data storage element 208 (or memory), which may be realized as any sort of non-transitory short or long term storage media capable of storing computer-readable (or machine-readable) programming instructions for execution by the processing system 204. The code or other executable programming instructions, when read and executed by the processing system 204, cause the processing system 204 to support or otherwise perform certain tasks, operations, functions, and/or processes described herein.

In exemplary embodiments described herein, the code or other executable programming instructions maintained at the data storage element 208 are configurable to cause the processing system 204 to execute, generate or otherwise support a user input management service 210 that functions as an intermediary between the user input device(s) 202 and any number of different display software applications 220, 222, 224 that are configurable to render, display, generate or otherwise provide one or more corresponding GUI elements or displays 230, 232, 234 on the display device(s) 206. In this regard, it should be noted that although FIG. 2 depicts the different display software applications 220, 222, 224 being executed, generated or otherwise supported by the processing system 204 (e.g., based on respective code or executable programming instructions maintained in memory 208), in practice, one or more of the display software applications 220, 222, 224 may be implemented by or at another component, which may be external to the display system 200 (e.g., the FMS 150 or other onboard avionics systems 160, 162, 164 coupled to the display system 110). Moreover, although FIG. 2 depicts a one to one relationship between the different display software applications 220, 222, 224 and the GUI displays 230, 232, 234, in practice, an individual display software application 220, 222, 224 may control, render or otherwise provide any number of different GUI elements or displays on the display device(s) 206. In this regard, the implementation details of the different display software applications 220, 222, 224 is not germane to the subject matter described herein.

In exemplary implementations, the user input management service 210 functions as an intermediary that effectively decouples any number of different user input devices 202 from any number of potential destination applications 220, 222, 224 for receiving user input. In this regard, in some implementations, the applications 220, 222, 224 notify or otherwise register the particular regions (or ranges of locations) where a GUI display 230, 232, 234 associated with that respective application 220, 222, 224 is depicted (e.g., by providing a range of pixel coordinate locations encompassed by a layer of the GUI display 230, 232, 234), thereby allowing the user input management service 210 to effectively create and maintain a hierarchical arrangement of different GUI layers associated with the different applications 220, 222, 224 for the different locations or regions of the display device(s) 206 where GUI displays 230, 232, 234 are presented. In such implementations, when a user input is initiated, the user input management service 210 utilizes the initial location information contained in the initial message (s) of the user input message stream received from the respective user input device 202 to identify which application 220, 222, 224 is associated with the top or uppermost layer in the hierarchical arrangement at that location on a display device 206. The user input management service 210 provides indicia of the user input at the initial user input location to the respective application(s) 220, 222, 224 registered at that location, where the respective gesture recognizer associated with the respective application(s) 220, 222, 224 identifies or otherwise determines whether and how to respond to the user input. In this regard, a gesture recognizer is a software component associated with or assigned to a particular region of a display that includes, encompasses or otherwise corresponds to an interactive feature, element or functionality of the respective software application 220, 222, 224.

When the gesture recognizer associated with the respective application(s) 220, 222, 224 determines the user input should be responded to (e.g., by virtue of the user input corresponding to selection of a GUI element or other interactive feature of the respective GUI display 230, 232, 234), the respective application 220, 222, 224 notifies the user input management service 210, which, in turn, maintains an association between the message stream for that user input and the respective application 220, 222, 224 having the highest position in the hierarchical arrangement (e.g., the application 220, 222, 224 associated with the GUI display 230, 232, 234 that overlies or is in front of other GUI displays 230, 232, 234 at that location) as being the originating application with respect to which the user input originated, such that the user input does not fall through to a lower layer on the display device 206. In other words, by virtue of the association, the associated application 220, 222, 224 is effectively subscribed to the message stream and the user input management service 210 routes messages associated with a particular message stream to its assigned application 220, 222, 224 subscribed to that message stream, so that any user input or other cursor interaction starting within the boundaries of a region associated with a particular gesture recognizer of the assigned application 220, 222, 224 is captured and subsequently interpreted solely by that gesture recognizer, even though the user input may move outside the boundary of the GUI display 230, 232, 234 associated with the assigned application 220, 222, 224. On the other hand, when the gesture recognizer determines the user input should not be responded to, the user input management service 210 maintains an association between the message stream for that user input and the respective application 220, 222, 224 but designates the user input message stream as non-interactive such that the assigned application 220, 222, 224 does not respond to the user input message stream within its extent beyond drawing a graphical representation of a cursor associated with the user input. For purposes of explanation, the respective application 220, 222, 224 associated with or otherwise assigned with responding to a particular message stream may alternatively be referred to herein as the subscribed application.

In practice, a user may utilize the cursor to select or otherwise interact with a text input element within the boundary of the GUI display 230, 232, 234 associated with the assigned application 220, 222, 224 where the cursor is located. Depending on the implementation, the text input element may be realized as a text box, a search box, or another suitable GUI element that accommodates free-form text input, while in other implementations, the text input element could be realized as a combo box, a list box, a drop-down menu, or another suitable GUI element capable of receiving and responding to character entry or other text input in a structured manner (e.g., to identify or select one of a set of predefined options). In this regard, the subject matter described herein is not limited to any particular type of text input element that may be incorporated into a GUI display 230, 232, 234 of a software application 220, 222, 224. By virtue of the user input management service 210 effectively decoupling the software applications 220, 222, 224 from the user input devices 202, in response to selection of a text input element, the user input management service 210 automatically identifies and assigns a keypad, keyboard or other text entry component (e.g., a knob, wheel, picker or the like that is rotatable and actuatable to select individual characters, etc.) to the assigned application 220, 222, 224 that is associated with or otherwise subscribed to the cursor, thereby associating that text entry component with the assigned application 220, 222, 224 that is responding to the cursor interaction. Thereafter, when the user interacts with a user input device 202 associated with the assigned text entry component to input or otherwise provide one or more characters of text input via the associated text entry component, the user input management service 210 automatically routes, transmits or otherwise provides that text input to the assigned application 220, 222, 224 associated with that text entry component, thereby allowing the assigned application 220, 222, 224 to respond to the text input while decoupling or abstracting the details of the keypads, keyboards or other text entry text entry components from the software applications 220, 222, 224.

In some implementations, the text entry component assigned to the software application 220, 222, 224 is realized as a physical or mechanical hardware user input device 202, such as a keypad, keyboard or other hardware device with different dedicated mechanical key switches, buttons or other human-machine interface elements assigned to different individual alphanumeric characters or character sets. In this regard, in some implementations, the user input management service 210 may identify the hardware text entry user input device 202 to be assigned to a particular software application 220, 222, 224 based on a predefined spatial relationship or association between the cursor control user input device 202 associated with the cursor selecting the text input element and the corresponding hardware text entry user input device 202. For example, when the cursor control user input device 202 is realized as a CCD, mouse or other cursor control associated with a pilot of an aircraft (e.g., a cursor control user input device 202 associated with the pilot's seat or the pilot's side of the cockpit), the user input management service 210 may automatically identify a hardware keypad or other hardware entry user input device 202 that was previously defined or otherwise configured to be associated with the pilot based on the spatial relationship between the devices (e.g., a cursor control user input device 202 associated with the pilot's seat or the pilot's side of the cockpit).

In other implementations, the text entry component may be realized as a virtual keypad or virtual keyboard that includes different buttons or other selectable GUI elements assigned to different individual alphanumeric characters or character sets that is rendered on or overlaying a GUI display on a touchscreen device 202. In some implementations, a virtual keypad or keyboard may be rendered or otherwise presented by the assigned software application 220, 222, 224 within the GUI display 230, 232, 234 associated with the assigned software application 220, 222, 224 (e.g., an application level virtual keyboard); however, in other implementations, a virtual keypad or keyboard may be rendered or otherwise presented on a separate overlying GUI display that may be distinct or separate from the GUI display 230, 232, 234 associated with the assigned software application 220, 222, 224 (e.g., a system level virtual keyboard) and rendered or otherwise presented by the user input management service 210 or another software application or service that is separate and distinct from the assigned software application 220, 222, 224.

As described in greater detail below, after associating a user input received from a cursor control user input device 202 with a software application 220, 222, 224 based on the location associated with the user input corresponding to a GUI display 230, 232, 234 associated with that software application 220, 222, 224, the user input management service 210 provides the user input to the assigned software application 220, 222, 224 for further handling. The assigned software application 220, 222, 224 processes or otherwise analyzes the received user input and the location thereof with respect to its associated GUI display 230, 232, 234 to detect or otherwise identify when the received user input corresponds to selection of interactive GUI elements contained within the respective GUI display 230, 232, 234. In response to user selection of a text input GUI element, the assigned software application 220, 222, 224 provides corresponding indication or notification to the user input management service 210, for example, by transmitting or otherwise providing a request for a text entry component to be associated with the software application 220, 222, 224. In some implementations, the software application 220, 222, 224 may be configurable to identify or otherwise request a particular text entry component to be assigned (e.g., based on settings or configuration of the software application 220, 222, 224), while in other implementations, the software application 220, 222, 224 may rely on the user input management service 210 identifying and assigning an appropriate text entry component to the software application 220, 222, 224 (e.g., based on a physical, logical or other predefined association between cursor control devices and text input devices).

After associating a text entry component (e.g., a physical or virtual keypad) with the software application 220, 222, 224, the user input management service 210 automatically routes, transmits or otherwise provides characters or other text input received from the assigned text entry component to its associated software application 220, 222, 224. The software application 220, 222, 224 then responds to the received text input in accordance with the selected text input GUI element, for example, by populating the selected text input GUI element with the received text input or otherwise updating the state of the selected text input GUI element in accordance with the received text input.

In exemplary implementations, the user input management service 210 and/or the software applications 220, 222, 224 are also configured to provide graphical indication of an expected or anticipated text input in response to user selection of a text input element. For example, after assigning a text entry component to a software application 220, 222, 224, the user input management service 210 may provide a corresponding command, instruction or other message to the software application 220, 222, 224 that identifies the assigned text entry component, thereby notifying the software application 220, 222, 224 that a text entry component has been assigned. In response to the notification of an assigned text entry component in response to user selection of a text input element, the software application 220, 222, 224 may dynamically update the graphical representation of the cursor rendered within its GUI display 230, 232, 234 to provide an animation that indicates an expected text input, such as, for example, a text cursor, a caret, an underscore or another flashing or animated cursor that provides a visual cue to the user that the system 200 is ready to receive text input. Additionally, or alternatively, in response to the notification of an assigned text entry component, the software application 220, 222, 224 may automatically clear any previously selected or previously input values associated with the selected text input element from presentation on the GUI display 230, 232, 234 (e.g., by clearing any text within a text box or other selected text input GUI element). In some implementations, previously input values may also be cleared or deleted from cache or other data storage such that they can be overwritten by the subsequently input text. In this regard, text input previously received from the assigned text entry component prior to the selection of the text input element may be deleted, cleared or otherwise discarded in response to the selection of the text input element after assigning the text entry component to the selected text input element.

In some implementations, the assigned text entry component is realized as a virtual keypad or virtual keyboard displayed on the display device 206 that provides a graphical indication of an expected text input in response to selection of a text input element. In some embodiments, when the virtual keypad is rendered by the software application 220, 222, 224 where the text input element was selected, the user input management service 210 may provide indication of the touchscreen or other user input device 202 to be assigned to the virtual keypad to the software application 220, 222, 224 to maintain an association between the user input device 202 and the virtual keypad at the software application 220, 222, 224, such that the text input may be received from the user in the form of a corresponding location on the virtual keypad at the software application 220, 222, 224, where the software application 220, 222, 224 translates or otherwise converts that selected location on the virtual keypad to one or more corresponding characters of text input at the software application 220, 222, 224. In other implementations, the virtual keypad may be rendered by the user input management service 210 or another software application 220, 222, 224, where the user input management service 210 or other software application 220, 222, 224 translates or otherwise converts a selected location on the virtual keypad to one or more corresponding characters of text input, which, in turn, are provided to the software application 220, 222, 224 where the text input element was selected based on the association between the virtual keypad and its subscribed or assigned software application 220, 222, 224.

For example, a user may utilize a cursor control user input device 202 to interact with an FMS application (e.g., an interactive application 220, 222, 224 associated with the FMS 150) to select text box or other GUI element to define an altitude target for a waypoint of the flight plan. In response to user selection of a GUI element to define an altitude value, the FMS application may transmit or otherwise provide a request for a text entry component to the user input management service 210, which, in turn, identifies a text entry user input device 202 to be assigned to the FMS application, such as, for example, a hardware keypad 202 (or keyboard) associated with the same aircraft operator (e.g., pilot or co-pilot) as the cursor control user input device 202 that was used to select that altitude GUI element. The user input management service 210 then instantiates and maintains an association between that hardware keypad 202 and the FMS application, such that characters of text input received via that hardware keypad 202 are automatically routed or otherwise provided to the FMS application. In response, the FMS application may dynamically update the text box or other altitude GUI element to reflect the characters of text input received from the user, such that the pilot or co-pilot can visually review the text input that was received by the FMS application. In this manner, the user input management service 210 enables the FMS application to receive characters of text input from a hardware keypad 202 or other text entry hardware components while decoupling and abstracting the exact details or type of text entry hardware component from the FMS application.

Figure 3:
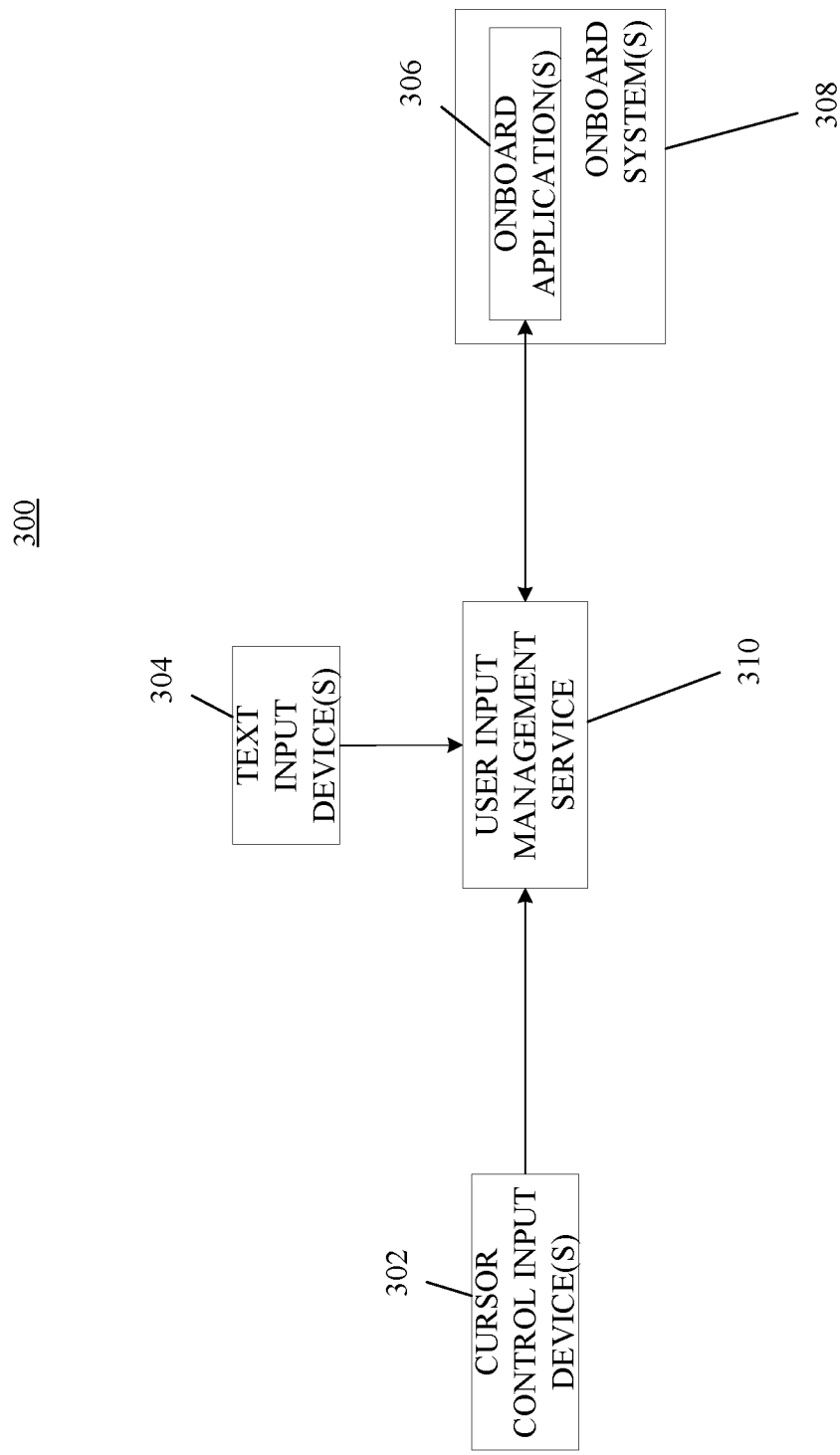
FIG. 3 is a block diagram of an interactive computing system suitable for use with the aircraft system of FIG. 1 or the display system of FIG. 2 in an exemplary embodiment.

FIG. 3 depicts an exemplary embodiment of an interactive computing system 300 suitable for use with a vehicle system (e.g., aircraft system 100 of FIG. 1) that includes user input devices 302, 304 (e.g., user input devices 140, 202) that are decoupled from interactive software applications 306 (e.g., software applications 220, 222, 224) at various onboard systems 308 (e.g., the FMS 150, the avionics systems 160, the navigation system 162, the communications system 164, and the like) via an intermediary user input management service 310 (e.g., user input management service 210). The various elements described in connection with FIG. 3 are similar to counterpart elements described above in the context of FIGS. 1-2 and for sake of brevity will not be redundantly described in the context of FIG. 3.

As depicted in FIG. 3, the interactive computing system 300 includes one or more cursor control input devices 302, such as, for example, CCDs, joysticks, mice, touchpads, touch panels (or touchscreens) or any other suitable devices for receiving a tactile or manual input from a user to control the position of a graphical representation of a cursor rendered on a display device (e.g., display device 130, 206). The interactive computing system 300 also includes one or more text entry user input devices 304, such as, for example, keypads, keyboards, buttons or any other suitable device for receiving alphanumeric characters or other text input from a user. In some implementations, the text entry user input device 304 may be realized as a touchscreen including a virtual keypad, keyboard or other text entry GUI element(s) rendered by the user input management service 310 and/or an onboard application 306.

In response to receiving a user input from a cursor control input device 302, the user input management service 310 identifies or otherwise determines an onboard application 306 to be associated with the cursor control input device 302 based on the physical location (or indication thereof) associated with the state of the cursor control input device 302 corresponding to a location on a display device associated with a GUI display or a GUI element rendered by that onboard application 306. The user input management service 310 creates and maintains an association between the cursor control input device 302 and the onboard application 306 and provides corresponding indication of the location associated with the cursor control input device 302 to the associated onboard application 306 for rendering a graphical representation of a cursor at a corresponding location on a GUI display associated with that onboard application 306. In this regard, when a user manipulates the cursor control input device 302 to make a selection (e.g., by depressing a button on a mouse, joystick or the like), the user input management service 310 provides corresponding indication of a user selection at the current location of the cursor control input device 302 to its associated onboard application 306 for further analysis and processing.

In response to the associated onboard application 306 determining the cursor control input device 302 has selected a text input GUI element within the GUI display associated with that onboard application 306, the onboard application 306 provides corresponding indication of the user's selection of text input GUI element to the user input management service 310, for example, by providing a request for a text entry component to be assigned to the onboard application 306 for receiving text input via the selected text input GUI element. In response to receiving the indication of user selection of a text input GUI element, the user input management service 310 automatically identifies or otherwise determines a text entry component to be associated with the onboard application 306 and then creates a corresponding association between the text input device 304 associated with that text entry component and the onboard application 306.

In some implementations, the user input management service 310 may automatically identify the hardware keypad, keyboard or other text entry user input device 304 associated with the cursor control input device 302 associated with that onboard application 306 and then creates or otherwise maintains an association between that text entry user input device 304 and the onboard application 306. For example, in response to determining that the pilot's cursor control user input device 302 (e.g., the CCD, mouse, joystick or the like arranged on the pilot side of the cockpit) is responsible for the user selection of the text input GUI element, the user input management service 310 may automatically identify the pilot's text entry user input device 304 (e.g., the hardware keypad, keyboard or other hardware input device arranged on the pilot side of the cockpit) as the text entry component to be associated with the onboard application 306. After establishing an association between the pilot text entry user input device 304 and the text input GUI element of the onboard application 306, the user input management service 310 automatically routes or otherwise provides any alphanumeric characters or other text input received via the pilot text entry user input device 304 to the onboard application 306. For example, in some implementations, the user input management service 310 may provide a unique identifier associated with the pilot text entry user input device 304 to the onboard application 306, which, in turn may be utilized to subscribe the onboard application 306 to broadcast messages associated with that identifier that include received character inputs in accordance with a publish/subscribe messaging scheme. That said, in other implementations, the user input management service 310 may utilize association between the pilot text entry user input device 304 and the onboard application 306 to route characters or other input received via the pilot text entry user input device 304 directly to its associated onboard application 306.

In other implementations, the onboard application 306 may request a particular text entry component to be associated with a selected text input GUI element in accordance with the settings or other preexisting or predefined configuration of that application 306. For example, in some implementations where the onboard application 306 supports a virtual keypad or virtual keyboard within the context of that onboard application 306, the onboard application 306 may request the user input management service 310 assign the touchscreen capable of supporting the virtual keypad or virtual keyboard at the appropriate location within the GUI display of the onboard application 306 as the text entry user input device 304 associated with the application 306. In other implementations, where the onboard application 306 is configured to support or utilize a particular type of hardware text entry user input device 304, the onboard application 306 may request the user input management service 310 assign a particular hardware keypad or hardware keyboard to the application 306. In yet other implementations, where the onboard application 306 is configured to support a system level virtual keypad or virtual keyboard, the onboard application 306 may request the user input management service 310 or another application 306 responsible for providing a system level virtual keypad or virtual keyboard create or otherwise instantiate the same and establish an association between the system level virtual keypad or virtual keyboard and the actively selected text input GUI element of that onboard application 306. Accordingly, the subject matter described herein is not limited to any particular type of text entry user input device 304 that may be assigned to a particular onboard application 306 where a cursor has previously selected a text input GUI element.

Figure 4:
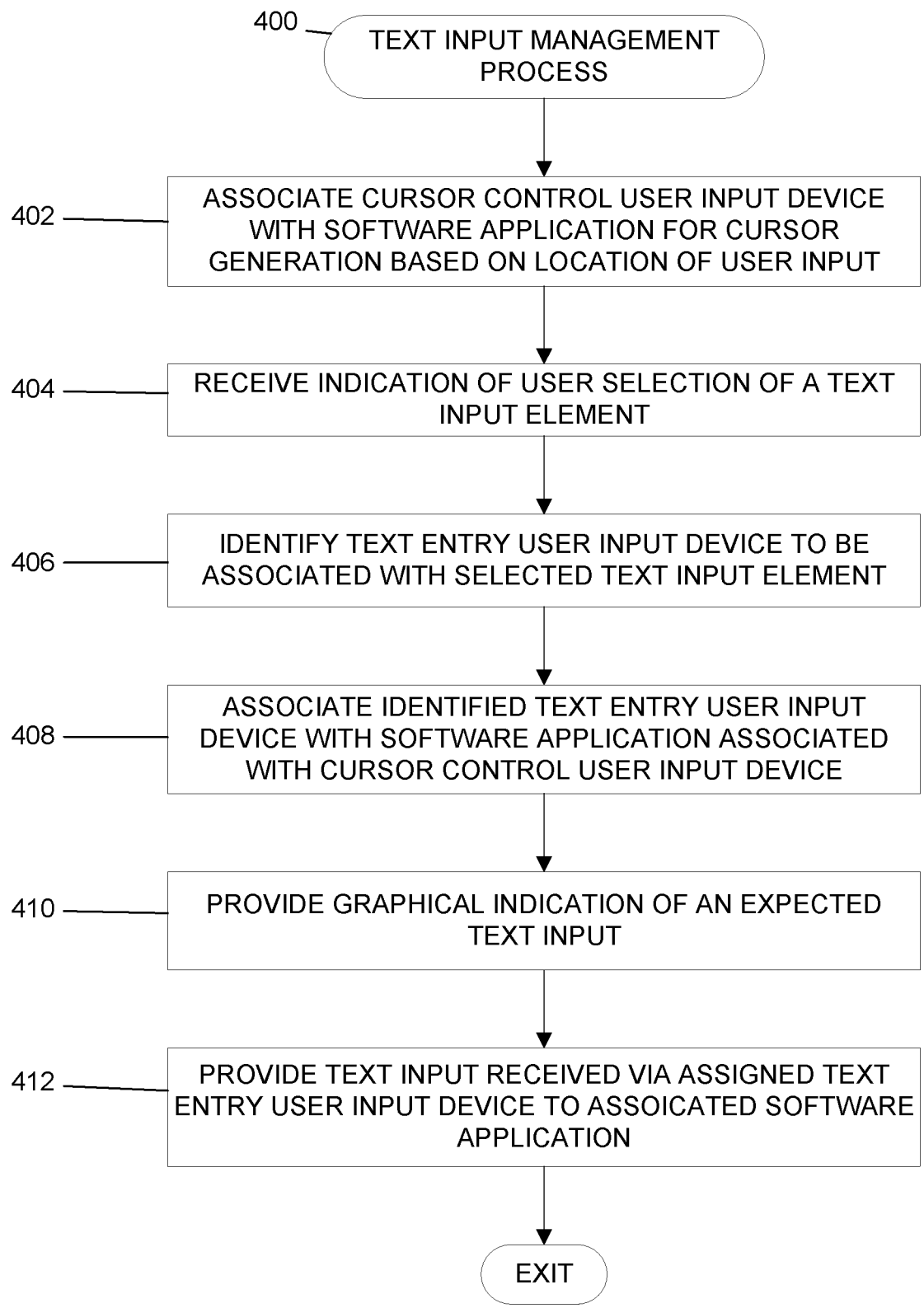
FIG. 4 is a flow diagram of a text input management process suitable for implementation by an interactive computing system associated with an aircraft system or another vehicle system in an exemplary embodiment.

FIG. 4 depicts an exemplary embodiment of a text input management process 400 suitable for implementation in a vehicle system to assign text entry components to destination software applications that have been decoupled from input devices via an intermediary service (e.g., user input management service 210, 310). The various tasks performed in connection with the illustrated process may be implemented using hardware, firmware, software executed by processing circuitry, or any combination thereof. For illustrative purposes, the following description may refer to elements mentioned above in connection with FIGS. 1-3. In practice, portions of the text input management process 400 may be performed by different elements of a vehicle system. That said, exemplary embodiments are described herein in the context of the text input management process 400 being primarily performed by a user input management service 210, 310 in connection with interactive software applications 220, 222, 224, 306. It should be appreciated that the text input management process 400 may include any number of additional or alternative tasks, the tasks need not be performed in the illustrated order and/or the tasks may be performed concurrently, and/or the text input management process 400 may be incorporated into a more comprehensive procedure or process having additional functionality not described in detail herein. Moreover, one or more of the tasks shown and described in the context of FIG. 4 could be omitted from a practical embodiment of the text input management process 400 as long as the intended overall functionality remains intact.

In the illustrated embodiment, the text input management process 400 initializes by associating a cursor control user input device with a software application for cursor generation based on the location corresponding to the user input received via that cursor control user input device (task 402). As described above, a user may manipulate a cursor control user input device 202, 302 to interact with a particular location on a GUI display 230, 232, 234 depicted on a display device 130, 206 associated with an interactive software application 220, 222, 224, 306. The user input management service 210, 310 receives the user input, and based on the initial location of the received user input, the user input management service 210, 310 identifies or otherwise determines the software application 220, 222, 224, 306 responsible for responding to the received user input and establishes an association between the cursor control user input device 202, 302 and that responsible software application 220, 222, 224, 306. The user input management service 210, 310 then transmits or otherwise provides indicia of the received user input and/or the assigned cursor control user input device 202, 302 to the responsible software application 220, 222, 224, 306. Examples of a user input management service 210, 310 identifying a software application responsible for responding to user input are described in greater detail in U.S. patent application Ser. No. 18/050, 568, which is incorporated by reference herein.

The text input management process 400 continues by receiving or otherwise obtaining indication of user selection of a text input element by the cursor assigned to that particular software application and identifying or otherwise determining the text entry user input device to be associated with the selected text input element for receiving manually input characters or other text input corresponding to the selected text input element (tasks 404, 406). For example, as described above, in response to user selection of a text box or similar text input GUI element by a depicted cursor within a GUI display 230, 232, 234 associated with a software application 220, 222, 224, 306, the software application 220, 222, 224, 306 assigned with the cursor generates or otherwise provides a request to the user input management service 210, 310 for a text entry component to be utilized by the user to input text to the software application 220, 222, 224, 306 via the selected text input GUI element. In response to the request or other indication of a desire to receive text input on behalf of the software application 220, 222, 224, 306 responsible for generating a cursor, the user input management service 210, 310 identifies or otherwise determines the appropriate text entry component for that software application 220, 222, 224, 306 and then assigns the corresponding text entry user input device 202, 304 to that software application 220, 222, 224, 306. Depending on the implementation, the user input management service's 210, 310 may automatically identify or otherwise determine the text entry user input device 202, 304 to be assigned using various logical rules or defined associations between cursor control user input devices 202, 302 and text entry user input devices 202, 304 (e.g., by associating different user input devices based on collocation or physical disposition within an aircraft cockpit), while in other implementations, the user input management service 210, 310 may automatically identify or otherwise determine the text entry user input device 202, 304 to be assigned based on the configuration or settings of the particular application 220, 222, 224, 306 (e.g., where the software application 220, 222, 224, 306 requests a particular text entry user input device 202, 304).

After identifying the text entry user input device to be assigned to a software application, the text input management process 400 creates and maintains an association between the identified text entry user input device and provides a corresponding graphical indication of an expected text input on behalf of the user once text entry user input device has been assigned (tasks 408, 410). Thereafter, the text input management process 400 routes, transmits or otherwise provides text input received via the assigned text entry user input device to its associated destination software application (task 412). The destination software application responds to the text input in accordance with the application logic, for example, by associating the received text input with the selected text input GUI element (e.g., by invoking functionality associated with the selected text input GUI element using the received text input).

For example, a user may utilize a cursor control user input device 202, 302 to interact with a GUI display 230, 232, 234 provided by a software application 220, 222, 224, 306 associated with the FMS 150 or another onboard system 160, 162, 164, 308 to change, configure, define or otherwise input a user-desired value for a particular parameter, variable or setting. For example, a pilot could manipulate his or her CCD 202, 302 to interact with a text box for an altitude target associated with a particular waypoint of a flight plan on a waypoint list GUI display 230, 232, 234 to initiate a change to the altitude. Based on the initial location of the pilot's CCD 202, 302 being within the waypoint list GUI display 230, 232, 234, the user input management service 210, 310 establishes an association between the pilot's CCD 202, 302 and the FMS application 220, 222, 224, 306 providing the waypoint list GUI display 230, 232, 234 before providing corresponding indication of the location associated with the pilot's CCD 202, 302 to facilitate the FMS application 220, 222, 224, 306 rendering a graphical representation of a cursor within the waypoint list GUI display 230, 232, 234. In this manner, the user input management service 210, 310 effectively routes a message stream pertaining to the user input received via the pilot's CCD 202, 302 to the FMS application 220, 222, 224, 306 which dynamically updates the graphical representation of the cursor within the waypoint list GUI display 230, 232, 234.

In response to user selection of an altitude target text box while the graphical representation of the cursor is positioned overlying at least a portion of the text box, the FMS application 220, 222, 224, 306 provides a corresponding indication to request a text entry component for the text box via the user input management service 210, 310. The user input management service 210, 310 identifies the appropriate text entry user input device 202, 304 to be utilized for providing text input to the FMS application 220, 222, 224, 306 via the selected text box and creates or otherwise maintains an association between the FMS application 220, 222, 224, 306 and the assigned text entry user input device 202, 304. For example, when the cursor control user input device 202, 302 is realized as the pilot's CCD (or mouse, joystick or other input device on the pilot side of the cockpit), the user input management service 210, 310 may automatically identify a hardware keypad or hardware keyboard on the pilot side of the cockpit as the text entry user input device 202, 304 to be assigned to the FMS application 220, 222, 224, 306.

After assigning the pilot's hardware keypad 202, 304 to the FMS application 220, 222, 224, 306, the user input management service 210, 310 may provide a corresponding indication or notification to the FMS application 220, 222, 224, 306 that identifies the pilot's hardware keypad 202, 304 as being assigned to the FMS application 220, 222, 224, 306. In response to the pilot's hardware keypad 202, 304 being assigned, the FMS application 220, 222, 224, 306 may provide graphical indication of an expected text input (either automatically or in response to a command from the user input management service 210, 310), for example, by animating the cursor and/or the selected text box (e.g., by providing an animated text cursor within the text box) to provide a visual cue to the user that the FMS application 220, 222, 224, 306 is ready to receive text input. In this regard, the FMS application 220, 222, 224, 306 may clear, delete or otherwise remove from presentation any values previously depicted within the selected text box upon assignment of the pilot's hardware keypad 202, 304 to the FMS application 220, 222, 224, 306. In some implementations, the FMS application 220, 222, 224, 306 may also utilize the identifier of the assigned pilot's hardware keypad to temporarily subscribe to any message streams associated with the pilot's hardware keypad.

In a similar manner to the pilot's CCD 202, 302, the user input management service 210, 310 effectively routes a message stream pertaining to the characters of text input received via the assigned pilot's hardware keypad 202, 304 to the FMS application 220, 222, 224, 306, which, in turn, responds to the received text input in accordance with the logic and/or configuration of the FMS application 220, 222, 224, 306. In this manner, the pilot's hardware keypad 202, 304 is effectively captured by the altitude target text box of the FMS application 220, 222, 224, 306, and the association is maintained until a user input is received that terminates the current input (e.g., pressing an "enter" key, a "clear" key, or selecting a different interactive GUI element with the cursor). For example, the FMS application 220, 222, 224, 306 may dynamically update the selected altitude target text box to depict the alphanumeric characters of the received text input substantially in real-time as each character is received, thereby allowing the pilot to visually confirm that the received character inputs reflect the pilot's intent in real-time. When the pilot interacts with one of the pilot's input devices 202, 302, 304 to indicate the text input is complete (e.g., by hitting the enter button, selecting another button or interactive GUI element, and/or the like), the FMS application 220, 222, 224, 306 may dynamically update the flight plan or other aspects of the settings or configuration of the FMS application 220, 222, 224, 306 to reflect the received text input. Additionally, the FMS application 220, 222, 224, 306 may terminate the subscription to the pilot's hardware keypad 202, 304 or otherwise discontinue monitoring or listening for text input via the pilot's hardware keypad 202, 304, thereby allowing the user input management service 210, 310 to reassign the pilot's hardware keypad 202, 304 to a different application 220, 222, 224, 306 once the pilot relocates the cursor and begins interacting with interactive GUI elements within another software application 220, 222, 224, 306.

By virtue of the text input management process 400, text entry components may be dynamically and temporarily assigned to software applications substantially in real-time in response to user selection of text input elements, thereby allowing alphanumeric characters or other text input to be temporarily routed or otherwise provided to the appropriate destination software application 220, 222, 224, 306 while effectively decoupling the software applications 220, 222, 224, 306 from the particular physical user input devices 202, 302, 304. It should be noted that although the subject matter may be described herein in the context of hardware or virtual text entry components being assigned in response to selection of a text input element, in alternative implementations, a text entry user input device 202, 304 may be assigned to a particular destination software application 220, 222, 224, 306 in response to a user input received via that text entry user input device 202, 304. For example, after assigning a cursor control user input device 202, 302 to a particular software application 220, 222, 224, 306, the user input management service 210, 310 may receive input signals from a hardware keypad, keyboard or another text entry user input device 202, 304. In response, the user input management service 210, 310 may automatically assign that hardware keypad 202, 304 to the active software application 220, 222, 224, 306 assigned with rendering the cursor based on the current location associated with the cursor control user input device 202, 302. In such scenarios, selection of a text input GUI element within the GUI display 230, 232, 234 of the active software application 220, 222, 224, 306, either via the cursor control user input device 202, 302 or the assigned hardware keypad 202, 304, enables the software application 220, 222, 224, 306 to subsequently receive and respond to the text input received via the assigned hardware keypad 202, 304.

Exemplary implementations of the subject matter described herein may also support backward propagation of destination software application changes to the state of the text entry component, for example, in situations where the assigned text entry component is realized as a system level virtual keyboard, scratchpad, text box, or other text input element that is rendered or controlled by the user input management service 210, 310 or another software application 220, 222, 224, 306. For example, if the destination software application 220, 222, 224, 306 determines that the state of a scratchpad, text box, virtual keyboard, or other GUI display associated with the text entry user input device 304 assigned to the destination software application 220, 222, 224, 306 should be initialized or assigned a particular value (e.g., a particular set of characters or text), the destination software application 220, 222, 224, 306 may broadcast or otherwise provide a state update message including a unique identifier associated with its assigned text entry user input device 304 that is received by the user input management service 210, 310 or other software application 220, 222, 224, 306 and then utilized by the user input management service 210, 310 or other software application 220, 222, 224, 306 responsible for rendering the GUI display associated with the assigned text entry user input device 304 to update the state of the GUI display to reflect the updated value or text content provided by the assigned destination software application 220, 222, 224, 306 for that text input. In this regard, by virtue of the decoupling achieved by the user input management service 210, 310, such state changes can be managed and coordinated across the user input management service 210 and the relevant software applications 220, 222, 224, 306 without impacting other software applications 220, 222, 224, 306 or user input devices 202, 302, 304 unrelated to the particular destination software application 220, 222, 224, 306 at issue.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method comprising:
   associating, by a user input management service, a user input from a user input device with a first application based on a location associated with the user input corresponding to a first graphical user interface (GUI) display associated with the first application;
   providing, by the user input management service, the user input to the first application based on the association, wherein the first application responds to the user input;
   receiving, by the user input management service, indication of selection of a text input element by the user input from the first application; and
   in response to the indication of selection of the text input element:
      identifying, by the user input management service, a text entry component to be associated with the first application; and
      associating, by the user input management service, the text entry component with the first application; and
   thereafter:
      receiving, by the user input management service, a text input from the text entry component; and
      providing, by the user input management service, the text input to the first application based on the association between the text entry component and the first application, wherein the first application responds to the text input.

2. The method of claim 1, wherein:
   identifying the text entry component comprises the user input management service identifying a text entry user input device associated with the user input device; and
   associating the text entry component with the first application comprises associating the text entry user input device with the first application based at least in part on the association between the user input device and the first application.

3. The method of claim 2, wherein:
   the user input device comprises a cursor control user input device; and
   identifying the text entry user input device comprises identifying a hardware keypad or a hardware keyboard associated with the cursor control user input device.

4. The method of claim 3, identifying the hardware keypad or the hardware keyboard associated with the user input device comprises identifying the hardware keypad or the hardware keyboard associated with the cursor control user input device based on a predefined spatial relationship between the cursor control user input device and the hardware keypad or the hardware keyboard.

5. The method of claim 1, further comprising providing graphical indication of an expected text input in response to the indication of selection of the text input element.

6. The method of claim 5, wherein the graphical indication comprises a virtual keypad displayed on a display device comprising the first GUI display.

7. The method of claim 5, wherein the graphical indication comprises clearing a previously selected value associated with the text input element.

8. The method of claim 5, wherein the graphical indication comprises an animated cursor within the text input element.

9. The method of claim 1, wherein identifying the text entry component comprises the user input management service identifying a text entry user input device based at least in part on a configuration or a setting of the first application.

10. The method of claim 1, further comprising discarding, by the user input management service, a second text input received from the text entry component prior to selection of the text input element.

11. A non-transitory computer-readable medium having computer-executable instructions stored thereon that, when executed by a processing system, cause the processing system to:
- associate a user input from a user input device with a first application based on a location associated with the user input corresponding to a first graphical user interface (GUI) display associated with the first application;
- provide the user input to the first application based on the association, wherein the first application responds to the user input;
- receive indication of selection of a text input element by the user input from the first application; and
- in response to the indication of selection of the text input element:
  - identify a text entry component to be associated with the first application; and
  - associate the text entry component with the first application; and thereafter:
    - receive a text input from the text entry component; and
    - provide the text input to the first application based on the association between the text entry component and the first application, wherein the first application responds to the text input.

12. The non-transitory computer-readable medium of claim 11, wherein the text entry component comprises a text entry user input device associated with the user input device and the instructions are configurable to cause the processing system to associate the text entry user input device with the first application based at least in part on the association between the user input device and the first application.

13. The non-transitory computer-readable medium of claim 12, wherein the user input device comprises a cursor control user input device and the instructions are configurable to cause the processing system to identify the text entry user input device by identifying a hardware keypad or a hardware keyboard associated with the cursor control user input device.

14. The non-transitory computer-readable medium of claim 13, wherein the instructions are configurable to cause the processing system to identify the hardware keypad or the hardware keyboard associated with the cursor control user input device based on a predefined spatial relationship between the cursor control user input device and the hardware keypad or the hardware keyboard.

15. The non-transitory computer-readable medium of claim 11, wherein the instructions are configurable to cause the processing system to animate a graphical representation of a cursor within the first GUI display in response to the indication of selection of the text input element.

16. The non-transitory computer-readable medium of claim 15, wherein the instructions are configurable to cause the processing system to clear a previously selected value associated with the text input element.

17. The non-transitory computer-readable medium of claim 11, wherein the instructions are configurable to cause the processing system to identify the text entry component by identifying a text entry user input device based at least in part on a configuration or a setting of the first application.

18. The non-transitory computer-readable medium of claim 11, wherein the instructions are configurable to cause the processing system to provide graphical indication of an expected text input in response to the indication of selection of the text input element.

19. The non-transitory computer-readable medium of claim 11, wherein the instructions are configurable to cause the processing system to display a virtual keyboard on a display device comprising the first GUI display in response to the indication of selection of the text input element.

20. A system comprising:
- a cursor control user input device to provide a user input;
- a text entry user input device to provide a text input;
- an interactive application to provide a graphical user interface (GUI) display comprising a text input GUI element; and
- a user input management service coupled to the cursor control user input device, the text entry user input device, and the interactive application to:
  - associate the user input from the cursor control user input device with the interactive application based on a location associated with the user input corresponding to the GUI display associated with the interactive application;
  - provide the user input to the interactive application based on the association, wherein the interactive application renders a graphical representation of a cursor in response to the user input within the GUI display;
  - receive indication of selection of the text input GUI element by the user input from the interactive application;
  - associate the text entry user input device with the interactive application in response to the indication of selection of the text input GUI element; and
  - thereafter provide the text input to the interactive application based on the association between the text entry user input device and the interactive application, wherein the interactive application responds to the text input.

* * * * *